United States Patent
Kawaguchi et al.

(10) Patent No.: US 10,014,806 B2
(45) Date of Patent: Jul. 3, 2018

(54) STEPPING MOTOR DRIVING DEVICE AND TIMEPIECE

(71) Applicant: CASIO COMPUTER CO., LTD., Shibuya-ku, Tokyo (JP)

(72) Inventors: Yohei Kawaguchi, Akishima (JP); Yuta Saito, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 13 days.

(21) Appl. No.: 15/009,679

(22) Filed: Jan. 28, 2016

(65) Prior Publication Data

US 2016/0276967 A1  Sep. 22, 2016

(30) Foreign Application Priority Data

Mar. 19, 2015 (JP) ................. 2015-055556

(51) Int. Cl.
G04C 3/14 (2006.01)
H02P 8/12 (2006.01)
H02P 8/02 (2006.01)

(52) U.S. Cl.
CPC ............... H02P 8/12 (2013.01); G04C 3/143 (2013.01); G04C 3/146 (2013.01); H02P 8/02 (2013.01)

(58) Field of Classification Search
CPC ............... G04C 3/14; H02P 8/02; H02P 8/12
See application file for complete search history.

(56) References Cited

U.S. PATENT DOCUMENTS

| 4,542,329 | A | * | 9/1985 | Tu Xuan | G04C 3/143 310/49.24 |
| 9,181,057 | B2 | * | 11/2015 | Mashiba | H02P 8/16 |

FOREIGN PATENT DOCUMENTS

| JP | 2001161087 A | 6/2001 |
| JP | 2006101618 A | 4/2006 |
| JP | 2007252054 A | 9/2007 |
| JP | 2014195371 A | 10/2014 |

OTHER PUBLICATIONS

Machine Translation of JP 2014195371.*
Machine Translation of JP 2007252054.*
Machine Translation of JP 2006101618.*
Japanese Office Action (and English translation thereof) dated Nov. 22, 2016, issued in counterpart Japanese Application No. 2015-055556.

* cited by examiner

Primary Examiner — Edwin A. Leon
Assistant Examiner — Jason Collins
(74) Attorney, Agent, or Firm — Holtz, Holtz & Volek PC

(57) ABSTRACT

A stepping motor driving device drives a first coil and a second coil. The stepping motor driving device includes a motor control unit. The motor control unit applies a predetermined voltage to the first coil in a first phase, applies the predetermined voltage to the second coil in a second phase after the first phase, and alternately applies the predetermined voltage to the first coil and the second coil in a third phase after the second phase.

8 Claims, 8 Drawing Sheets

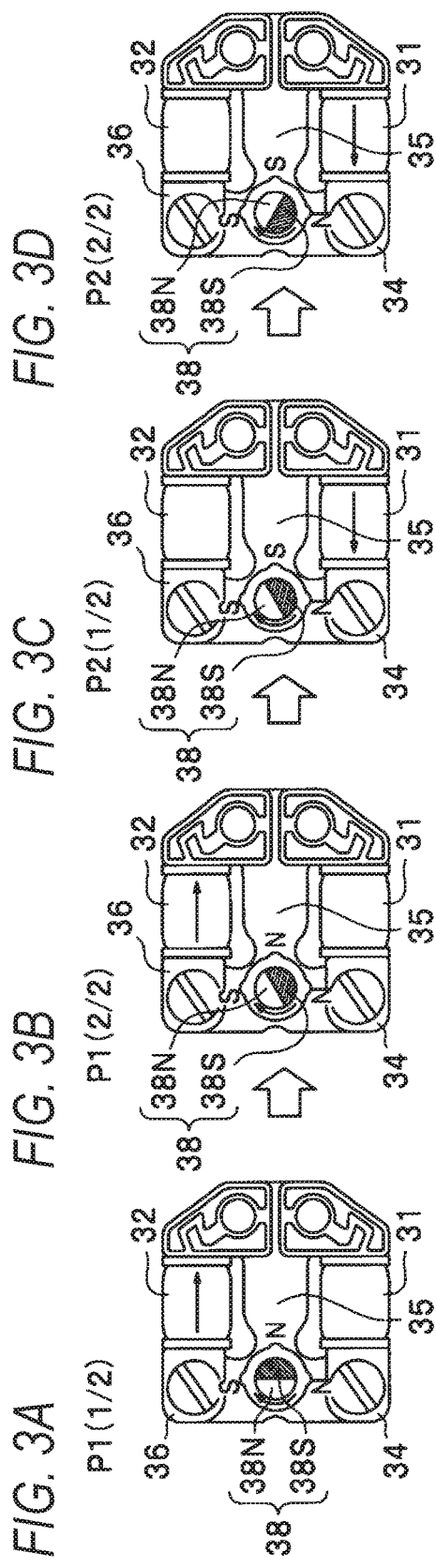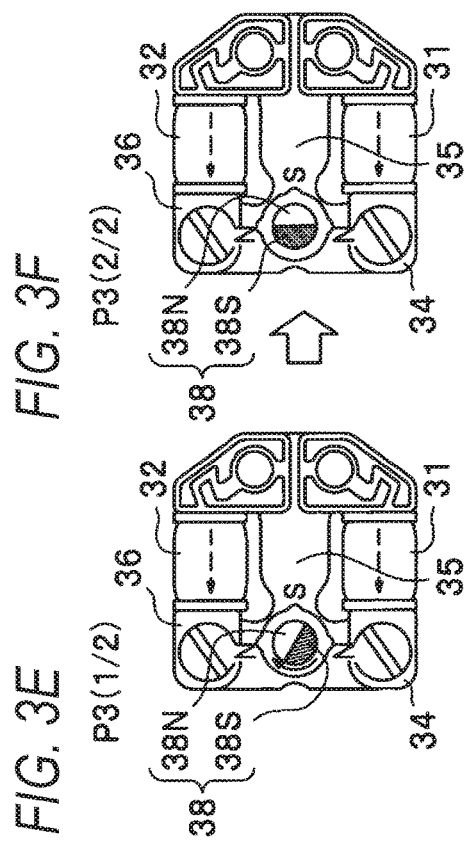

STEPPING MOTOR DRIVING DEVICE AND TIMEPIECE

CROSS-REFERENCE TO RELATED APPLICATION

This application is based upon and claims the benefit of priority from the prior Japanese Patent Application No. 2015-055556, filed on Mar. 19, 2015, and the entire contents of which are incorporated herein by reference.

BACKGROUND OF THE INVENTION

1. Field of the Invention

The invention relates to a stepping motor driving device and a timepiece.

2. Description of the Related Art

In the related art, a stepping motor configured to rotate forward and reversely is used for a timepiece and the like. For example, a stepping motor disclosed in JP-A-2014-195371 includes a rotor for which two-pole magnetization has been performed, three magnetic poles arranged around the rotor at an interval of 90 degrees, and coils wound on the two magnetic poles of the three magnetic poles. By appropriately applying driving pulses to the two coils, the stepping motor is rotated.

According to the technology disclosed in JP-A-2014-195371, when rotating the stepping motor, there are a time period for which only one of the two coils is energized and a time period for which both the two coils are energized. In this case, a peak of consumption current (current output from a battery cell) appears in the latter time period. Here, when the latter time period is made to be shorter than the former time period, the energy that is to be consumed in the stepping motor can be made to be substantially the same in both the time periods. However, the power that is to be consumed due to an internal resistance of the battery cell and the like is proportional to a square of the consumption current. Therefore, according to the technology disclosed in JP-A-2014-195371, the power that is to be consumed in the latter time period increases, so that the battery cell is rapidly drained.

SUMMARY OF THE INVENTION

It is therefore an object of the invention to provide a stepping motor driving device and a timepiece capable of suppressing a peak of consumption current.

In order to achieve the above object, according to the invention, a stepping motor driving device drives a first coil and a second coil. The stepping motor driving device includes a motor control unit. The motor control unit applies a predetermined voltage to the first coil in a first phase, applies the predetermined voltage to the second coil in a second phase after the first phase, and alternately applies the predetermined voltage to the first coil and the second coil in a third phase after the second phase.

BRIEF DESCRIPTION OF THE DRAWINGS

FIGS. 3A through 3F depict operations of the stepping motor in the first illustrative embodiment.

DESCRIPTION OF THE PREFERRED EMBODIMENT

First Illustrative Embodiment

Overall Configuration

Hereinafter, a stepping motor driving device according to a first illustrative embodiment of the invention will be described in detail with reference to a block diagram shown in FIG. 1.

Figure 1:
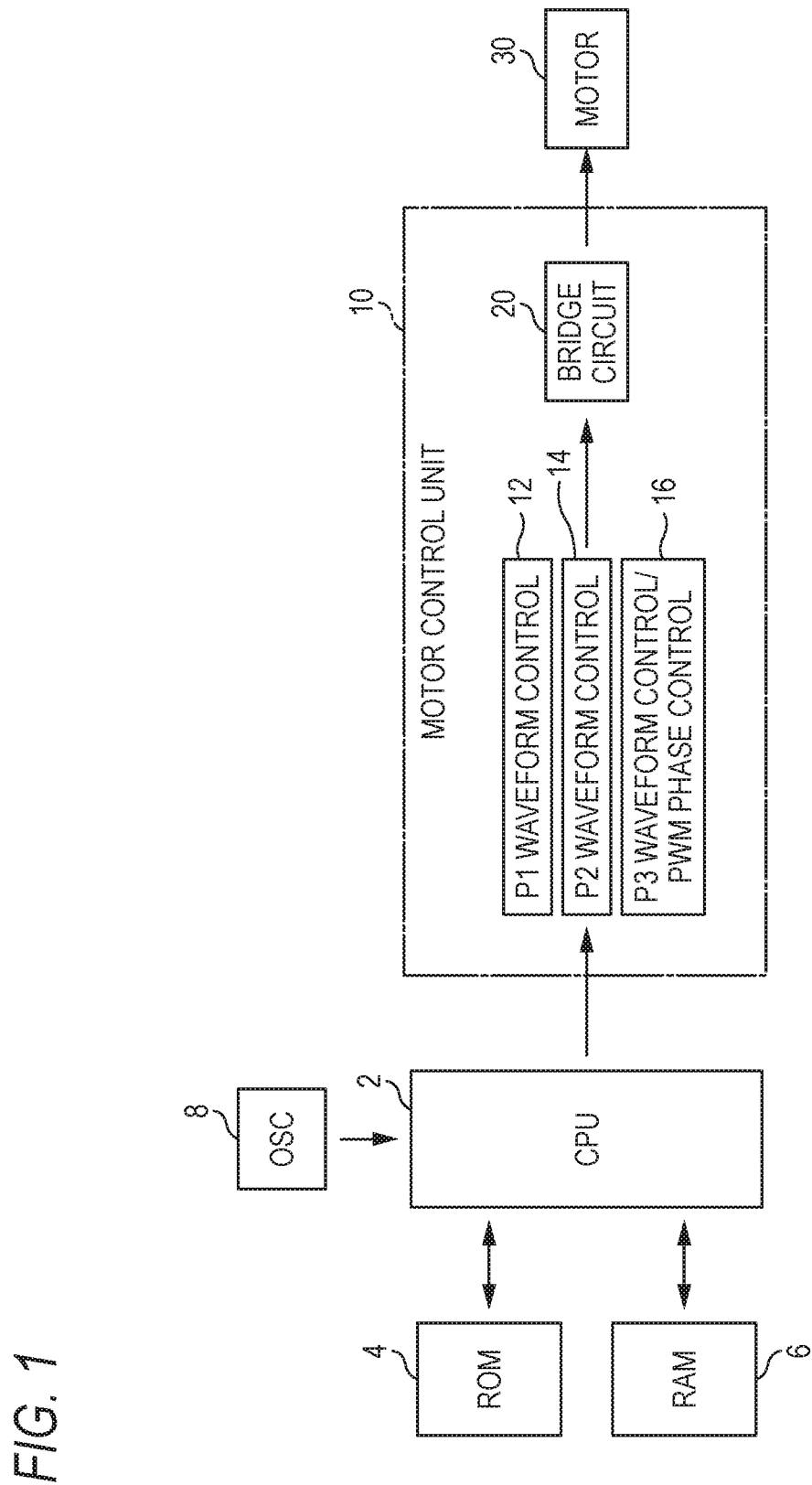
FIG. 1 is a block diagram of a stepping motor driving device according to a first illustrative embodiment of the invention.

In FIG. 1, a CPU (Central Processing Unit) 2 is configured to output a variety of commands to a motor control unit 10, based on a control program stored in a ROM (Read Only Memory) 4. A RAM (Random Access Memory) 6 is used as a work memory of the CPU 2. An oscillator ('OSC' in FIG. 1) 8 is configured to output an operating clock to the CPU 2.

A stepping motor 30 includes a rotor having a permanent magnet, and a stator having two coils. A bridge circuit 20 in the motor control unit 10 is configured to drive the stepping motor 30 by applying a square wave or a PWM (pulse width modulation)-modulated voltage to the two coils. Driving states of the stepping motor 30 include three phases such as phases P1, P2, P3, which will be described later. A P1 waveform control unit 12, a P2 waveform control unit 14 and a P3 waveform control/PWM phase control unit 16 in the motor control unit 10 are configured to control the bridge circuit 20 in the phases P1, P2, P3, respectively. The motor control unit 10 includes the P1 waveform control unit 12, the P2 waveform control unit 14, the P3 waveform control/PWM phase control unit 16, and the bridge circuit 20. The P1 waveform control unit 12, the P2 waveform control unit 14, the P3 waveform control/PWM phase control unit 16 and the bridge circuit 20 may be a single device or may perform respective operations by devices separately provided.

(Stepping Motor 30)

Figure 2:
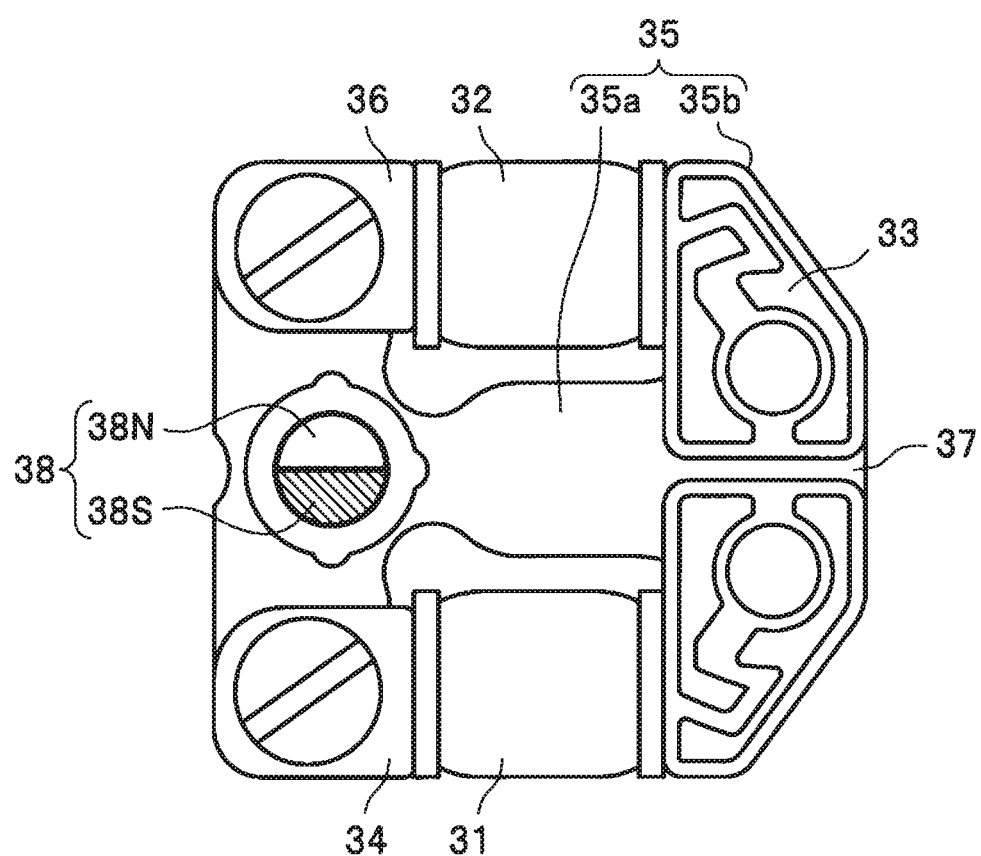
FIG. 2 is a plan view of a stepping motor in the first illustrative embodiment.

Subsequently, a detailed configuration of the stepping motor 30 is described with reference to FIG. 2. FIG. 2 is a plan view of the stepping motor 30.

The stepping motor 30 has a stator 37 and a rotor 38. The rotor 38 has a disc shape, is supported to be rotatable in a circumferential direction, and has a permanent magnet for which two-pole magnetization has been performed diametrically. In the rotor 38, a non-hatched part configures an N pole 38N, and a hatched part configures an S pole 38S. When applying the stepping motor 30 to a timepiece and the like, the rotor 38 is preferably coupled with toothed wheels, which configure a hand-moving mechanism for moving a timepiece indicator, and the rotor 38 is rotated to rotate the toothed wheels and the like.

The stator 37 has a center yoke 35 and a pair of side yokes 34, 36. The center yoke 35 has a linear portion 35a and a protruding portion 35b provided at one end-side of the linear portion 35a and protruding symmetrically in an upper and lower direction, and forms a substantial T shape as a whole.

The side yokes 34, 36 are configured to surround the rotor 38 in the upper and lower direction and are formed to protrude in the upper and lower direction.

Coils 31, 32 are inserted between the protruding portion 35b of the center yoke 35 and the side yokes 34, 36, and the coils 31, 32 are connected to a bridge circuit 20 (refer to FIG. 1) via terminal blocks 33.

Subsequently, the three phases P1, P2, P3 upon the driving of the stepping motor 30 are described with reference to FIGS. 3A to 3F, which depict operations of the stepping motor 30.

As shown in FIG. 3A, when the S pole 38S of the rotor 38 faces rightward, the phase P1 starts at this state. In the phase P1, the current is supplied to the coil 32 so that a magnetic flux directed from the left to the right is generated, as shown with an arrow in the coil 32, under control of the motor control unit 10 configured to function as the P1 waveform control unit 12. On the other hand, the current is not supplied to the coil 31. Thereby, the side yoke 36 becomes an S pole around the rotor 38, and the side yoke 34 and the center yoke 35 become N poles. Then, as shown in FIG. 3B, the rotor 38 is rotated so that the S pole 38S of the rotor 38 faces in a right and lower direction. The rotor 38 shown in FIG. 3B is rotated rightward by about 60 degrees with respect to FIG. 3A.

Subsequently to the state of FIG. 3B, an operation in the phase P2 starts. In the phase P2, the current is supplied to the coil 31 so that a magnetic flux directed from the right to the left is generated, as shown with an arrow in the coil 31 of FIG. 3C, under control of the motor control unit 10 configured to function as the P2 waveform control unit 14. On the other hand, the current is not supplied to the coil 32. Thereby, the side yoke 36 and the center yoke 35 become the S poles around the rotor 38, and the side yoke 34 becomes the N pole. Then, as shown in FIG. 3D, the rotor 38 is rotated so that the S pole 38S of the rotor 38 faces in a left and lower direction. The rotor 38 shown in FIG. 3D is rotated rightward by about 60 degrees with respect to FIG. 3C.

Subsequently to the state of FIG. 3D, an operation in the phase P3 starts. In the phase P3, the currents are supplied to both the coils 31, 32 so that a magnetic flux directed from the right to the left is generated, as shown with arrows in the coils 31, 32 of FIG. 3E, under control of the motor control unit 10 configured to function as the P3 waveform control/PWM phase control unit 16.

Thereby, the side yokes 34, 36 become the N poles around the rotor 38, and the center yoke 35 becomes the S pole. Then, as shown in FIG. 3F, the rotor 38 is rotated so that the S pole 38S of the rotor 38 faces in a right direction. The rotor 38 shown in FIG. 3F is rotated rightward by about 180 degrees with respect to FIG. 3A. In the meantime, as described in detail later, the currents flowing in the coils 31, 32 in the phase P3 are all PWM-modulated.

In this way, the rotor 38 is rotated by 180 degrees through the phases P1, P2, P3. When further rotating the rotor 38, the currents are preferably supplied to the coils 31, 32 so that the directions (arrows) of the magnetic flux shown in FIGS. 3A to 3F are reverse.

(Bridge Circuit 20)

In the below, a configuration of the bridge circuit 20 is described with reference to a circuit diagram of FIG. 4.

Figure 4:
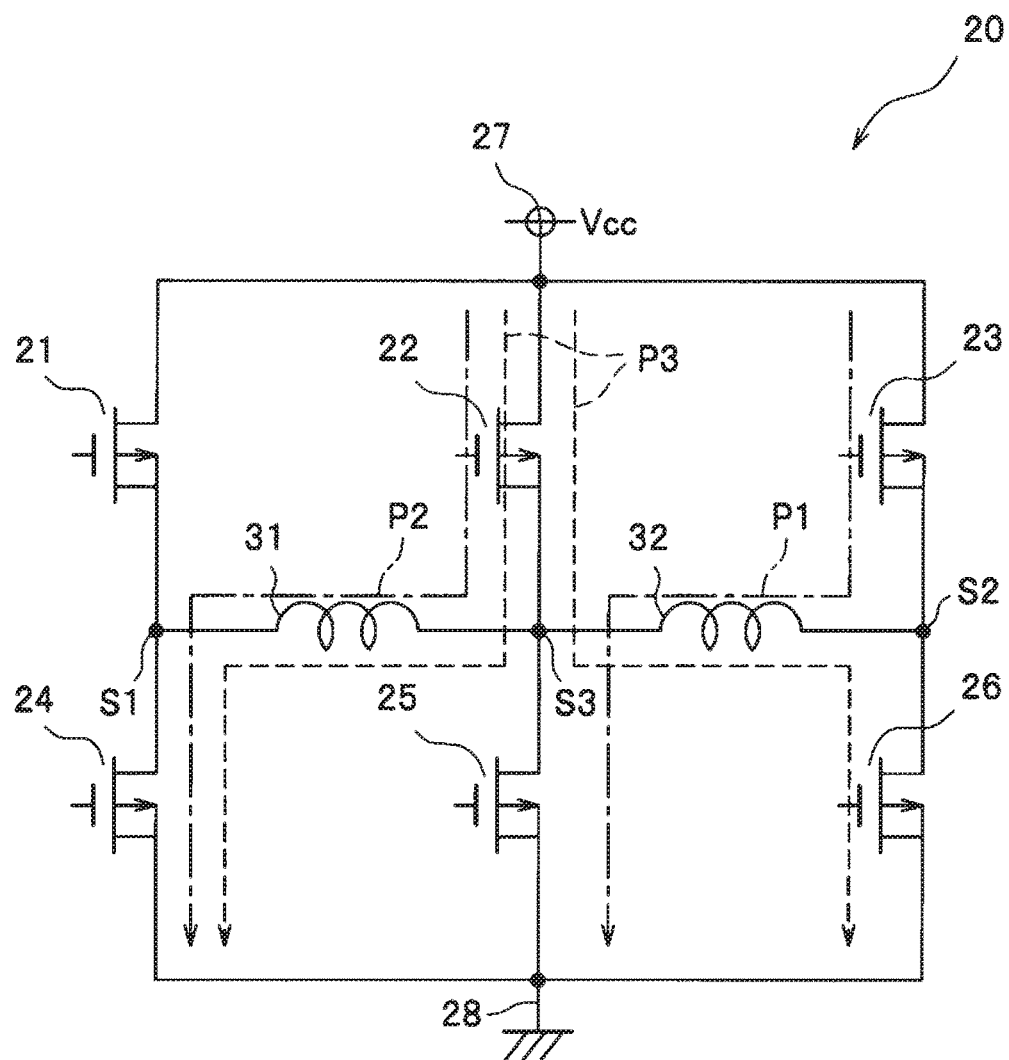
FIG. 4 is a circuit diagram of a bridge circuit in the first illustrative embodiment.

In FIG. 4, a power supply voltage Vcc is applied between a voltage input terminal 27 and an earth terminal 28 by a battery cell and the like (not shown). Between the voltage input terminal 27 and the earth terminal 28, MOSFETs (Metal-Oxide-Semiconductor Field-Effect Transistors) 21, 24 are connected in series via a connection point S1, MOSFETs 22, 25 are connected in series via a connection point S3, and MOSFETs 23, 26 are connected in series via a connection point S2. Also, the coil 31 of the stepping motor 30 is connected between the connection points S1, S3, and the coil 32 is connected between the connection points S2, S3.

In the phase P1, the MOSFETs 23, 25 become on, and the other MOSFETs become off. Thereby, the power supply voltage Vcc is applied to the coil 32, and the current flows in a direction facing from the connection point S2 towards the connection point S3. Also, in the phase P2, the MOSFETs 22, 24 become on, and the other MOSFETs become off. Thereby, the power supply voltage Vcc is applied to the coil 31, and the current flows in a direction facing from the connection point S3 towards the connection point S1.

Also, in the phase P3, the MOSFET 22 is kept at the on state, and the on and off states of the MOSFETs 24, 26 are switched in a complementary manner with a duty ratio 50%. Also, the other MOSFETs become off. Therefore, during a time period for which the MOSFET 26 is on, the power supply voltage Vcc is applied to the coil 32, and the current flows in a direction facing from the connection point S3 towards the connection point S2. Also, during a time period for which the MOSFET 24 is on, the power supply voltage Vcc is applied to the coil 31, and the current flows in the direction facing from the connection point S3 towards the connection point S1.

Figure 5:
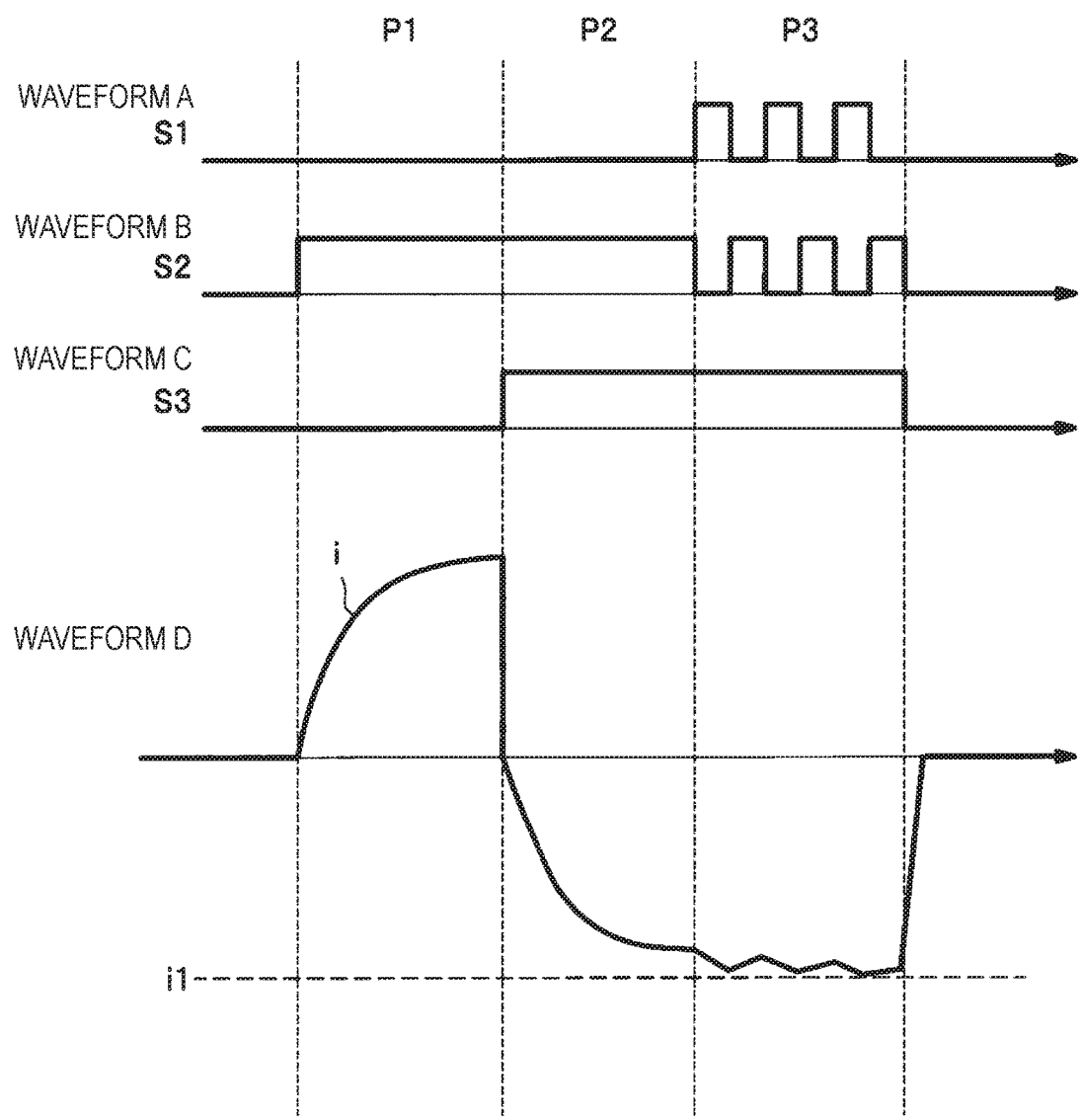
FIG. 5 is waveform diagrams of respective units of the bridge circuit in the first illustrative embodiment.

Waveforms A to C of FIG. 5 are waveform diagrams of the voltages at the connection points S1, S2, S3. As shown in the waveform A and the waveform B of FIG. 5, according to the illustrative embodiment, a PWM period (on/off period) of the phase P3 is '⅓' of a time period of the phase P3. Therefore, the voltages at the connection points S1, S2 increase three times in the phase P3, respectively.

A waveform D of FIG. 5 is a waveform diagram of current i flowing in the bridge circuit 20. Here, the current i is a sum of current values flowing in the coils 31, 32 when the direction directed from the connection points S1, S2 towards the connection point S3 is referred to as a positive direction. In the waveform D of FIG. 5, a peak value i1 of an absolute value of the current i appears in the phase P3.

Comparative Examples

In the below, two comparative examples are described so as to clearly verify the effects of the first illustrative embodiment. First, the comparative example 1 is described.

A hardware configuration of the comparative example 1 is the same as the first illustrative embodiment, and the operations in the phases P1, P2 are also the same as the first illustrative embodiment. However, in the phase P3 of the comparative example 1, both the MOSFETs 24, 26 (refer to FIG. 4) become continuously on.

Figure 6:
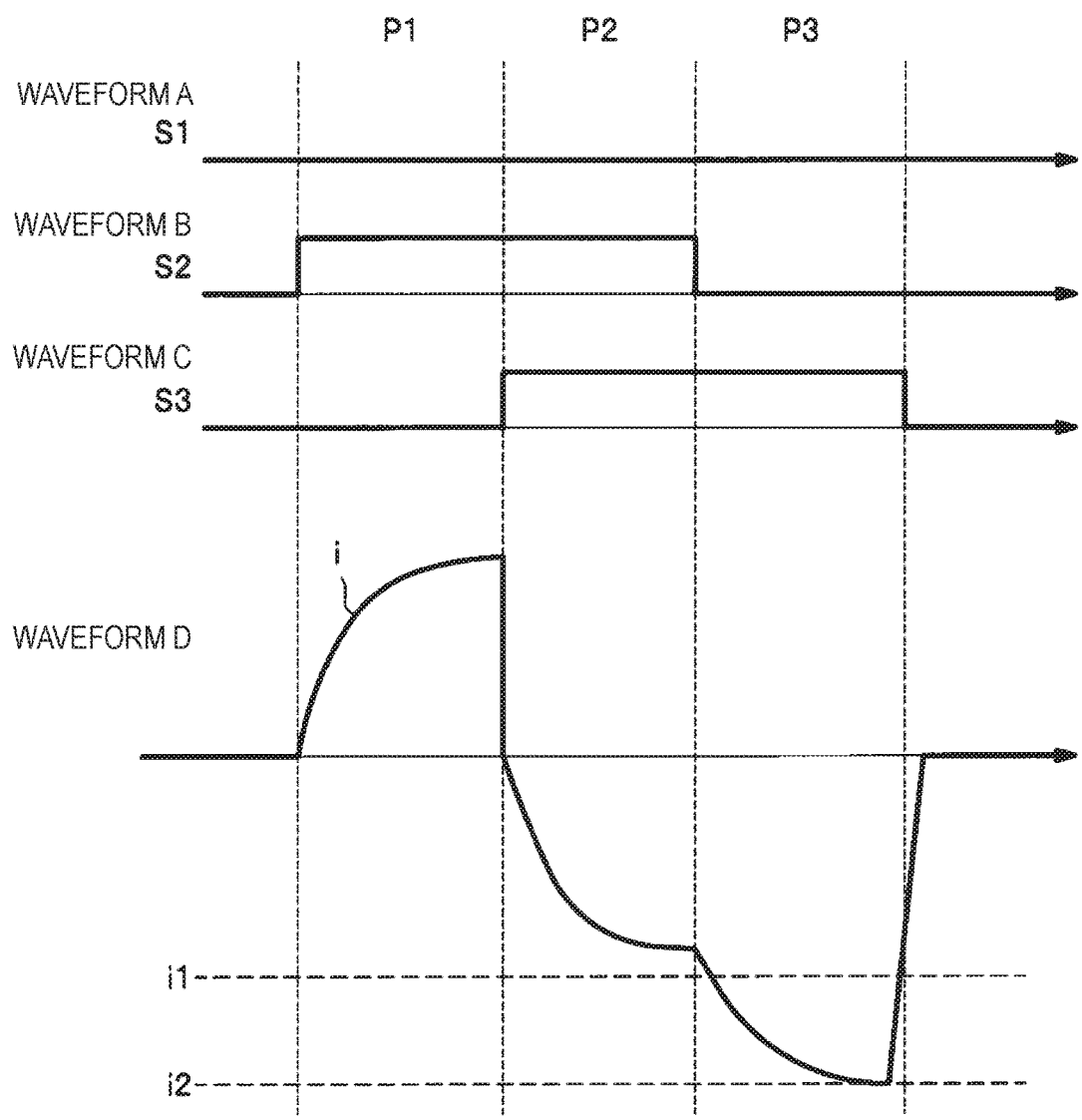
FIG. 6 is waveform diagrams of respective units of a bridge circuit in a comparative example 1.

FIG. 6 is waveform diagrams of respective units in the comparative example 1.

Like FIG. 5, waveforms A to C of FIG. 6 are waveform diagrams of the voltages at the connection points S1, S2, S3, and a waveform D of FIG. 6 is a waveform diagram of the current i flowing in the bridge circuit 20. In the waveform D of FIG. 6, it can be seen that a peak value i2 of an absolute value of the current i is greater than the peak value i1 of the first illustrative embodiment.

Subsequently, the comparative example 2 is described. A hardware configuration of the comparative example 2 is the same as the first illustrative embodiment, and the operations in the phases P1, P2 are also the same as the first illustrative embodiment. However, in the phase P3 of the comparative example 2, both the MOSFETs 24, 26 (refer to FIG. 4) have the duty ratio 50% and become on and off at the same phase.

Figure 7:
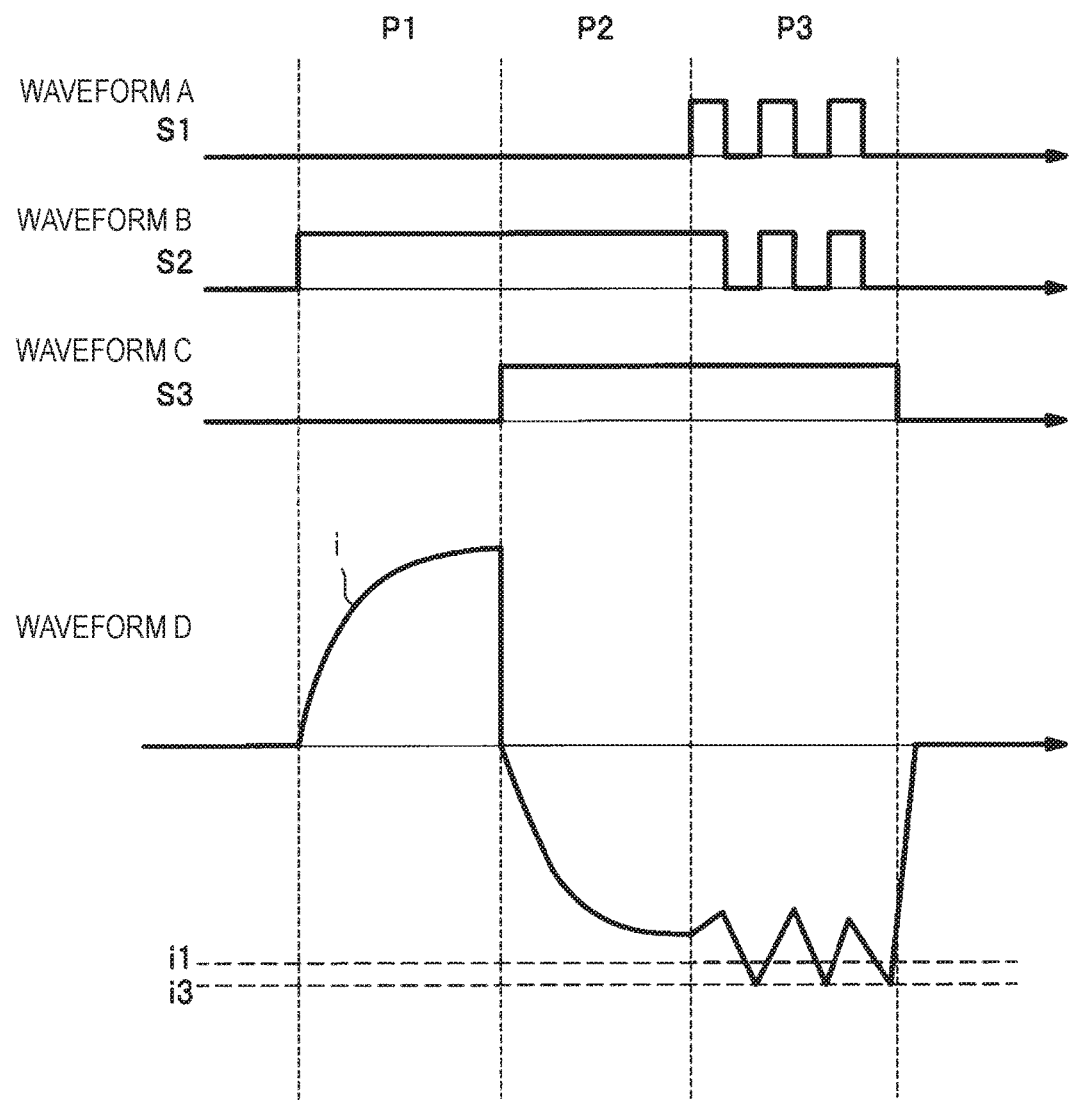
FIG. 7 is waveform diagrams of respective units of a bridge circuit in a comparative example 2.

FIG. 7 is waveform diagrams of respective units in the comparative example 2.

Like the waveforms A to D of FIG. 5, waveforms A to C of FIG. 7 are waveform diagrams of the voltages at the connection points S1, S2, S3, and a waveform D of FIG. 7 is a waveform diagram of the current i flowing in the bridge circuit 20. In the waveform D of FIG. 7, a peak value i3 of an absolute value of the current i is less than the peak value i2 of the comparative example 1 but is greater than the peak value i1 of the first illustrative embodiment.

Comparing with the comparative examples 1, 2, according to the first illustrative embodiment, it can be seen that since the on and off states of the MOSFETs 24, 26 are switched in a complementary manner at the timing of the phase P3 at which the peak current becomes greatest and the peak of the current i can be thus suppressed, it is possible to suppress the power loss proportional to a square of the current i, thereby suppressing the drain of the battery cell and the like. That is, according to the first illustrative embodiment, a polarity of the electric signal for controlling the on and off states of the MOSFETs 24, 26 in the time period of the phase P3 at which the peak current becomes greatest is switched in a complementary manner with a period (for example, ⅓ of the time period of the phase P3) different from a period of the time period of the phase P1 and a period of the time period of the phase P2. Thereby, it is possible to suppress the peak of the current I and the power loss proportional to a square of the current i, thereby suppressing the drain of the battery cell and the like.

Second Illustrative Embodiment

In the below, an analog timepiece of a second illustrative embodiment of the invention is described with reference to a plan view of FIG. 8.

Figure 8:
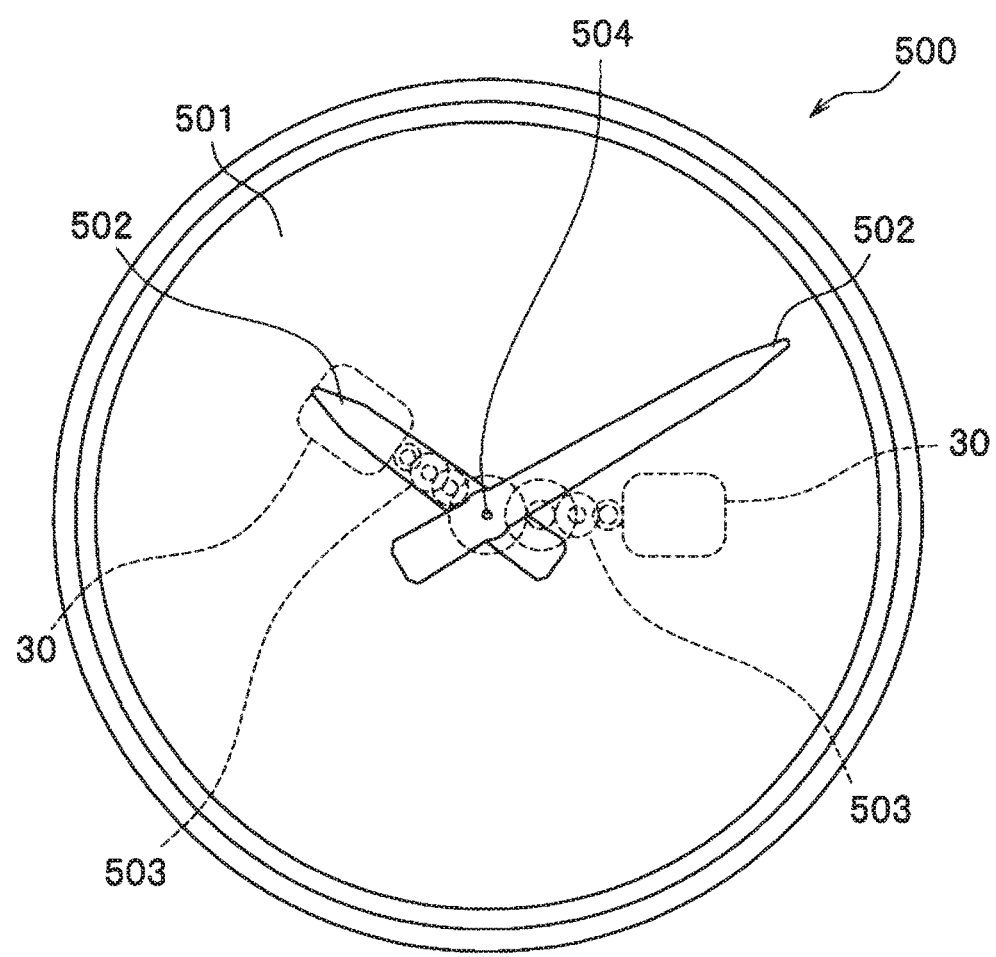
FIG. 8 is a plan view of an analog timepiece in a second illustrative embodiment of the invention.

In FIG. 8, an analog timepiece 500 has a dial plate 501, and two indicators (an hour hand and a minute hand) 502 configured to rotate about an indicator shaft 504 on the dial plate 501. Also, two stepping motor 30 are mounted on a backside of the dial plate 501 in correspondence to the two indicators 502, and are configured to rotate the corresponding indicators 502 via respective hand-moving mechanisms 503.

The stepping motors 30 are the same as the stepping motor 30 described in the first illustrative embodiment, and are respectively configured to be driven by the stepping motor driving device shown in FIG. 1. In the meantime, the analog timepiece 500 may be provided with more indicators. According to the second illustrative embodiment, since the indicators 502 are rotated by the stepping motor driving device (FIG. 1) of the first illustrative embodiment, it is possible to suppress a peak value of consumption current of the analog timepiece 500, thereby suppressing the drain of the battery cell (which is a power supply of the analog timepiece) and the like.

Modified Embodiments

The invention is not limited to the above illustrative embodiments, and a variety of changes can be made. The above illustrative embodiments are exemplarily provided so as to easily understand the invention, and the invention is not limited to an example where all the configurations described above are provided. Also, some of the configurations of any illustrative embodiment can be replaced with the configurations of the other illustrative embodiment, and the configurations of any illustrative embodiment can be added with the configurations of the other illustrative embodiment. Also, some of the configurations of the respective illustrative embodiments may be omitted or added/replaced with the other configurations. Modified embodiments of the above illustrative embodiments are exemplified as follows.

(1) In the second illustrative embodiment, the stepping motor driving device of the first illustrative embodiment is applied to the analog timepiece 500. However, the stepping motor driving device of the first illustrative embodiment can be applied to a variety of electronic devices without being limited to the timepiece.

(2) In the phase P3 of the first illustrative embodiment, the duty ratios of the on and off states of the MOSFETs 24, 26 are all 50%. However, a dead time may be provided. Even when the dead time is provided, the duty ratios of the on and off states of the MOSFETs 24, 26 are preferably the same. For example, when a length of the dead time is set to be 10% of the time period of the phase P3, the duty ratios of the on and off states of the MOSFETs 24, 26 are all preferably 45%.

(3) In the phase P3 of the first illustrative embodiment, the PWM period (on/off period) is '⅓' of the time period of the phase P3. However, the PWM period may be 1/n (n: a natural number of 2 or greater) of the time period of the phase P3. Also, in the phase P3 of the first illustrative embodiment, the PWM period (on/off period) is '⅓' of the time period of the phase P3. However, the PWM period may be determined on the basis of a limit value of the peak current to be obtained from a remaining battery level.

(4) Instead of the MOSFETs 21 to 26 applied in the first illustrative embodiment, the other switching elements can also be applied.

[Overview of Configurations and Effects]

As described above, the stepping motor driving device of each illustrative embodiment is the stepping motor driving device having the first coil and the second coil 32, 31 and includes the motor control unit 10 configured to apply the predetermined voltage Vcc to the first coil 32 in the first phase P1, to apply the predetermined voltage Vcc to the second coil 31 in the second phase P2 after the first phase P1, and to alternately apply the predetermined voltage Vcc to the first coil and the second coil 32, 31 in the third phase P3 after the second phase P2.

Also, the motor control unit 10 configured to function as the third waveform control unit 16 is configured to alternately apply the predetermined voltage Vcc to the first coil and the second coil 32, 31 with the same duty ratio in the third phase P3. The motor control unit 10 is configured to set the period, with which the predetermined voltage Vcc is to be applied to the first coil and the second coil 32, 31 in the third phase P3, to 1/n (n: a natural number of 2 or greater) of the time period of the third phase P3. The motor control unit 10 is configured to set the third period with which the motor control unit 10 applies the predetermined voltage to the first coil and the second coil 32, 31 in the third phase P3 in such a way that the third period is different from the first period with which the motor control unit 10 applies the predetermined voltage to the first coil 32 in the first phase P1 and the third period is different from the second period with which the motor control unit 10 applies the predetermined voltage to the second coil 31 in the second phase P2.

Thereby, in the respective illustrative embodiments, it is possible to suppress the peaks of the currents flowing in the first coil and the second coil 32, 31.

What is claimed is:

1. A stepping motor driving device which drives a first coil and a second coil, the stepping motor driving device comprising:
   a motor control unit that applies a predetermined voltage to the first coil in a first phase, that applies the predetermined voltage to the second coil in a second phase after the first phase, and that alternately applies the predetermined voltage to the first coil and the second coil in a third phase after the second phase,
   wherein, during the third phase, the motor control unit controls an application pattern of the predetermined voltage applied to the first and second coils such that a peak current is lower than a peak current in a case where the predetermined voltage is applied to the first and second coils with a same polarity.

2. The stepping motor driving device according to claim 1, wherein:
   the motor control unit alternately applies the predetermined voltage to the first coil and the second coil with a same duty ratio in the third phase.

3. A timepiece comprising the stepping motor driving device according to claim 2.

4. The stepping motor driving device according to claim 1, wherein:
   a period for which the motor control unit applies the predetermined voltage to the first coil and the second coil in the third phase is 1/n of a time period of the third phase; and
   n is a natural number equal to or greater than two.

5. A timepiece comprising the stepping motor driving device according to claim 4.

6. The stepping motor driving device according to claim 1, wherein:
   a third period for which the motor control unit applies the predetermined voltage to the first coil and the second coil in the third phase is different from a first period for which the motor control unit applies the predetermined voltage to the first coil in the first phase; and
   the third period is different from a second period for which the motor control unit applies the predetermined voltage to the second coil in the second phase.

7. A timepiece comprising the stepping motor driving device according to claim 6.

8. A timepiece comprising the stepping motor driving device according to claim 1.

* * * * *